United States Patent
Kenna, III et al.

(10) Patent No.: US 9,094,403 B2
(45) Date of Patent: Jul. 28, 2015

(54) ELECTRONIC MEDIA DISTRIBUTION SYSTEM AND MOBILE DEVICE

(71) Applicant: The Marlin Company, Wallingford, CT (US)

(72) Inventors: Frank Kenna, III, Branford, CT (US); Preeti Patel, Norwalk, CT (US)

(73) Assignee: THE MARLIN COMPANY, Wallingford, CT (US)

( * ) Notice: Subject to any disclaimer, the term of this patent is extended or adjusted under 35 U.S.C. 154(b) by 0 days.

(21) Appl. No.: 14/273,875

(22) Filed: May 9, 2014

(65) Prior Publication Data
US 2014/0289364 A1    Sep. 25, 2014

Related U.S. Application Data

(63) Continuation-in-part of application No. 12/723,744, filed on Mar. 15, 2010, now Pat. No. 8,826,168, which is a continuation of application No. 11/541,160, filed on Sep. 29, 2006, now Pat. No. 7,743,112, which is a continuation-in-part of application No. 11/050,093, filed on Feb. 3, 2005, now Pat. No. 7,765,273, which is a continuation of application No. 09/758,833, filed on Jan. 11, 2001, now abandoned.

(60) Provisional application No. 61/821,934, filed on May 10, 2013.

(51) Int. Cl.
| | |
|---|---|
| *G06Q 10/00* | (2012.01) |
| *H04L 29/08* | (2006.01) |
| *G06Q 10/10* | (2012.01) |
| *G06Q 30/02* | (2012.01) |
| *H04L 29/06* | (2006.01) |
| *H04N 21/231* | (2011.01) |
| *H04N 21/258* | (2011.01) |
| *H04N 21/2743* | (2011.01) |
| *H04N 21/41* | (2011.01) |
| *H04N 21/414* | (2011.01) |
| *H04W 12/02* | (2009.01) |

(52) U.S. Cl.
CPC ............... *H04L 67/10* (2013.01); *G06Q 10/10* (2013.01); *G06Q 30/02* (2013.01); *G06Q 30/0272* (2013.01); *H04L 63/0428* (2013.01); *H04N 21/23109* (2013.01); *H04N 21/25816* (2013.01); *H04N 21/2743* (2013.01); *H04N 21/4126* (2013.01); *H04N 21/41407* (2013.01); *H04W 12/02* (2013.01); *H04L 2463/101* (2013.01)

(58) Field of Classification Search
CPC .. H04L 29/08072; H04L 29/06; G06Q 30/02; G06Q 50/01
USPC .......................................... 709/217; 705/344
See application file for complete search history.

(56) References Cited

U.S. PATENT DOCUMENTS 7,206,748 B1 *   4/2007   Gruse et al. ..................... 705/51
7,240,025 B2 *   7/2007   Stone et al. ................. 705/14.16

(Continued)

*Primary Examiner* — Seye Iwarere
(74) *Attorney, Agent, or Firm* — Cantor Colburn LLP

(57) ABSTRACT

A method and system for the distribution of electronic media content to employees of a subscriber include an electronic display for displaying electronic media content that may be selected, modified and/or generated by the subscriber. The system allows for increased subscriber control of the media content presented as well as for increased security for any confidential media content to be presented on the customer display. The system further provides remote access for the subscriber to select, modify and/or generate electronic media content from any geographic location via a mobile device. In addition, the system provides for individual control of multiple displays that may be located in differing geographic locations while at the same time providing for ease of information management.

8 Claims, 8 Drawing Sheets

(56) References Cited

U.S. PATENT DOCUMENTS

| | | | |
|---|---|---|---|
| 2001/0051996 A1* | 12/2001 | Cooper et al. | 709/217 |
| 2005/0265555 A1* | 12/2005 | Pippuri | 380/284 |
| 2006/0212537 A1* | 9/2006 | Hans et al. | 709/217 |
| 2007/0113184 A1* | 5/2007 | Haot et al. | 715/723 |
| 2007/0156841 A1* | 7/2007 | Balakrishnan et al. | 709/217 |
| 2007/0161402 A1* | 7/2007 | Ng et al. | 455/554.2 |
| 2007/0294170 A1* | 12/2007 | Vantalon et al. | 705/50 |
| 2008/0109528 A1* | 5/2008 | Knight et al. | 709/217 |
| 2008/0115178 A1* | 5/2008 | Godin | 725/97 |
| 2008/0117339 A1* | 5/2008 | Kirsche | 348/734 |
| 2008/0301749 A1* | 12/2008 | Harrar et al. | 725/131 |

* cited by examiner

ELECTRONIC MEDIA DISTRIBUTION SYSTEM AND MOBILE DEVICE

CROSS-REFERENCE TO RELATED APPLICATION

This application claims the benefit of U.S. Provisional Application No. 61/821,934, filed on May 10, 2013. This application is a continuation-in-part of U.S. patent application Ser. No. 12/723,744, filed on Mar. 15, 2010, which is a continuation of U.S. patent application Ser. No. 11/541,160 filed on Sep. 29, 2006 (now U.S. Pat. No. 7,743,112), which is a continuation-in-part of U.S. patent application Ser. No. 11/050,093 filed on Feb. 3, 2005 (now U.S. Pat. No. 7,765,273), which is a continuation of U.S. patent application Ser. No. 09/758,833 filed on Jan. 11, 2001.

BACKGROUND

The present disclosure relates generally to employee communication programs and, more particularly, to publishing and distributing employee communications.

Modern business management calls for effective communications between management and employees. Among various other techniques for communicating with employees, conventional employee communication programs have typically included providing a bulletin board upon which printed material, such as posters including photographs, artwork, designs and/or slogans, and messages, are displayed. Topics that may be the subjects of employee communications are diverse and may involve safety, work quality, teamwork, morale and self-motivation. For example, since safety is an important consideration in most working environments, a poster with a slogan relating to the exercise of caution in potentially dangerous situations may be displayed for impressing upon employees an employer's requirement for observing on-the-job safety. Other examples of representative employee communications include news releases about the company, messages for boosting employee morale and/or messages relating to employee activities.

In conventional systems, graphic designers may develop posters and other employee communications by hand or on a computer aided design system. Typically, they are printed as a large employee communication for display and then sent to a client for mounting to a bulletin board. The bulletin board may be relatively sophisticated and creatively organized for efficiency and visual attention, such as a three-panel bulletin board on the order of 26 inches (66 centimeters) by 63 inches (160 centimeters). The posters are typically manually replaced to communicate corporate goals, news of interest and employee activities to employees.

At regular time intervals, such as once a month or once a week, clients may select new posters and messages and/or the new posters and messages are automatically selected, printed and shipped periodically to each client. Because of the large number and variety of clients and the specific requirements for certain users, there are significant inefficiencies associated with selecting, printing and shipping the employee communications. This is especially so where various bulletin boards located throughout a company's various facilities require different material to be posted on differing bulletin boards.

In addition, achieving a relatively high degree of customization and selectivity with traditional manual bulletin board systems is economically problematic.

Conventional systems also do not provide for immediate or on-the-spot distribution of new content and information to employees, which may be important if the new information, for example, pertains to safety hazards or potentially dangerous situations in a working environment. Since selecting, printing, and shipping employee communications requires a significant amount of time, the distribution of new content and information will be delayed. In certain circumstances, the information to be distributed may become outdated and/or irrelevant by the time distribution occurs.

Accordingly, it is desired to provide an efficient system that overcomes many of the deficiencies of prior art systems and services.

SUMMARY

The embodiments described herein replace the display of printed employee communications with a method and apparatus for distribution of electronic media. In one embodiment, electronic media replaces the physical posters and printed materials, and the conventional bulletin board is replaced by an electronic display. Maintaining the employee communications in electronic form from creation to display significantly reduces costs, while at the same time, dramatically improves distribution time and flexibility of an employee communications program.

One embodiment of the present invention may include an electronic communication display system transmitting media data to one or more remote client locations where the media is displayed, e.g. to employees. The electronic communication display system in this particular embodiment comprises an electronic display for displaying media, and a client computer that receives data corresponding to the media for display. A web server capable of communicating with the client computer for transmission of data thereto is also provided. The web server along with an application server, which may comprise one or more machines, communicating with the web server formulates the data for ultimate transmission to the client computer.

It is envisioned that a service provider of the workplace communications may maintain the web server and applications server. The provider may also design and store certain electronic employee communications suitable for a variety of business types, e.g., manufacturing, sales, service, etc. The electronic employee communications may be provided to businesses as, for example, a subscription service. A subscriber may be provided with the electronic display and client computer for display of electronic employee communications produced by the provider. Alternatively, the subscriber may utilize existing compatible equipment for receipt and display of the media. The subscriber provides information about his business to the provider to aid the provider's software in producing pertinent electronic employee communications. The subscriber is granted limited access to the provider's application server to enable the subscriber to choose, alter and/or generate new custom electronic employee communications, which are to be delivered to the subscriber's electronic display.

In one embodiment, a system is provided that allows for selection of pre-assembled media content, customization of the pre-assembled media content by the subscriber or generation of new media content by the subscriber. In this manner, the subscriber has full control over the media content supplied to the subscriber's employees. It is contemplated that the subscriber may categorize particular media content into collections, e.g., certain media content may be selected to be played on a display for maintenance personnel while other selected media content may be selected to be played on a display for management personnel. It is still further contemplated that the various collections may be linked to certain groups, e.g., it is determined that while the various maintenance personnel at the subscriber's various complexes may not be presented with an identical presentation, there are particular media collections that will be displayed at all maintenance displays.

It is further contemplated that the subscriber may generate custom media content for display to its employees, whether by alteration of the pre-assembled media content or generation of entirely new media content.

In some instances, the subscriber may not want confidential employee communications to be accessible to individuals outside of the subscriber's company. Accordingly, provision is made for confidential media information to remain or be stored on the subscriber's system. When the run program for the display advances to the point of displaying the confidential media information, rather than pulling this information from the service provider server, the system is directed to the customer's systems (e.g., customer computer, server, mobile device) to retrieve the confidential information.

In another embodiment, it is still contemplated that full customization of the media presentation may be provided to the subscriber, including, for example, the ability to adjust the content and sequence of the media information displayed and the length of time each piece of media is played on the display. In another embodiment, multi-language capability is further provided to the subscriber to be selected as desired.

In one configuration, the electronic communication display system may comprise two computers, a service provider computer I server and a client computer I server at a subscriber-designated remote location. The service provider computer stores electronic employee communications, sorts and keeps track of each subscriber's order. Each remote location of the system has a client server that is hooked up to the Internet and to an electronic display. The client server polls the service provider computer I server on a regular basis and retrieves an updated assortment of employee communications in electronic form, which are then displayed on the electronic display. The electronic display may be configured to also show regularly updated news, weather and sports information, or any other type of information desired by the subscriber.

The client computer I server may also be provided with a web browser configured in display mode for display of the media. The web browser may contain a plurality of channels wherein each of the channels contains an electronic poster or an electronic message.

Another preferred embodiment of the invention involves a method of providing customized employee communications in electronic form to a plurality of remote subscriber locations and comprises the steps of: creating employee communication collections containing several electronic employee communications for each subscriber; posting the employee communication collections on a server connected to the Internet; selectively permitting or excluding the subscriber's employees to access the server and allowing the subscriber to: view one or more of the employee communication collections; alter the content of the one or more employee communication collections by: adding or deleting particular electronic employee communications; modifying the content of one or more electronic employee communications; and/or creating a new electronic employee communication for inclusion in the employee communication collection; delivering the employee communication collection to one or more remote subscriber locations designated by the subscriber; and displaying the employee communication collection on one or more electronic displays designated by the subscriber.

In one embodiment, a system for transmitting and displaying electronic media from a service provider to a subscriber is provided comprising a controller for receiving an electronic media collection, a display coupled to the controller for displaying the electronic media collection provided by the controller, and a controller storage for storing the electronic media collection received by the controller. The system further comprises a service provider computer coupled to the controller via a network connection, wherein the service provider computer transmits the electronic media collection to the controller. A service provider storage is coupled to the service provider computer for storing the electronic media collection transmitted to the controller. In addition, a customer computer is coupled to the service provider computer via a network connection for generating the electronic media collection to be transmitted to the controller. The electronic media collection is selected from the group consisting of pre-assembled media content generated and provided by the service provider to the subscriber for selection, modified pre-assembled media content generated by the subscriber, and/or custom generated media content generated for or by the subscriber. The system is provided such that the subscriber selects from among the electronic media to generate the electronic media collection.

In another embodiment, a system for transmitting and displaying electronic media from a service provider to a subscriber is provided comprising a controller for receiving an electronic media collection, a display, coupled to the controller, displaying the electronic media collection provided by the controller, and a service provider computer coupled to the controller via a network connection, the service provider computer transmitting the electronic media collection to the controller. The system further comprises a service provider storage coupled to the service provider computer, for storing the electronic media collection transmitted to the controller and a customer computer having a customer storage and coupled to the service provider computer via a network connection for generating the electronic media collection to be transmitted to the controller. The system is provided such that the electronic media collection includes confidential and/or non-confidential media content, wherein the confidential media content is stored on the customer storage and the non-confidential media content is stored on the service provider storage. The system is further provided such that the electronic media collection includes the non-confidential media content transmitted from the service provider computer to the controller, the electronic media collection also including an address to direct the controller to download the confidential media content from the customer storage.

In still another embodiment, a system for transmitting and displaying electronic media from a service provider to a subscriber is provided comprising a controller for receiving an electronic media collection, a display coupled to the controller for displaying the electronic media collection provided by the controller, a service provider computer coupled to the controller via a network connection, the service provider computer being adapted to transmit the electronic media collection to the controller, and wherein a mobile device is coupleable to the service provider computer via a cellular connection for generating the electronic media collection. The mobile device is adapted to provide for remote and mobile access to the service provider computer, which enables a system user, e.g., subscriber, to administer and control the system from any geographic location. In particular, the mobile device provides for selecting pre-assembled media content, modifying pre-assembled media content, and/or custom-generating media content to be included in the electronic media collection.

The mobile device may include a mobile storage connected thereto, wherein the mobile storage stores the electronic media collection generated by the mobile device. Furthermore, the system comprises a service provider storage coupled to the service provider computer, for storing the electronic media collection that is generated by the mobile device and transmitted to the controller. The electronic media collection may comprise confidential media content and/or non-confidential media content. The mobile storage is adapted to store confidential media content while the service provider storage is configured only to store non-confidential media content. In some embodiments, the mobile storage may store both confidential and non-confidential media content. The system may be configured such that the electronic media collection is formed from non-confidential media content transmitted from the service provider computer to the controller and confidential media content transmitted from the mobile device to the controller. More specifically, the electronic media collection includes a mobile address to direct the controller to establish a secure cellular connection with the mobile device and obtain the confidential media content directly from the mobile storage. In some embodiments, where the electronic media collection comprises non-confidential media content originating from the mobile device, the service provider computer downloads the non-confidential media content via the cellular connection coupling the mobile device and the service provider computer. The service provider computer saves the non-confidential media content into the service provider storage and transmits it to the controller. Alternatively, the controller may download the non-confidential media content directly from the mobile device via the cellular connection directly coupling the mobile device and the controller.

The system may be further adapted such that a customer computer is coupled to the service provider computer via a network connection, wherein the customer computer is also configured to generate electronic media collection to be transmitted to the controller. The system may be arranged such that the generation of the electronic media collection can be performed from either the mobile device or the customer computer at any given moment. In some embodiments, the system may be configured to give the mobile device priority such that if generation and transmission of electronic media collection is attempted simultaneously from the mobile device and the customer computer, the controller accepts only the electronic media collection derived from the mobile device. In other embodiments, the system may be configured such that the customer computer is given priority and the controller accepts only the electronic media collection generated on the customer computer when generation of electronic media is attempted simultaneously on the mobile device. The customer computer also has a customer storage for storing the electronic media collection that is generated by the customer computer. In particular, the customer storage stores confidential media content that may be part of the electronic media collection generated by the customer computer. An electronic address which points to the location of the confidential media content stored on the customer storage is provided in the electronic media collection instead of the actual confidential media content. The controller interprets the electronic address to establish a network connection with the customer storage and download the confidential media content therefrom. In some embodiments, the mobile device may be adapted to also couple with the customer computer via a cellular connection for transmission of electronic media collection, including confidential and/or non-confidential media content, between the two components.

In a further advantageous embodiment, a system for transmitting and displaying electronic media from a service provider to a subscriber is provided comprising a controller for receiving an electronic media collection, a display coupled to the controller for displaying the electronic media collection provided by the controller, a service provider computer coupled to the controller via a network connection, the service provider computer being adapted to transmit the electronic media collection to the controller, a customer computer coupled to the service provider computer via a network connection, and wherein a mobile device is coupleable to the customer computer via a cellular connection. Both the customer computer and the mobile device are adapted to generate the electronic media collection singly (not simultaneously). In particular, the electronic media collection may be generated by the mobile device and transmitted to the customer computer for saving on a customer storage. The customer computer, thereafter, transmits the electronic media collection to the service provider computer and to the controller. The system further comprises a service provider storage for storing the electronic media collection transmitted to the controller.

The electronic media collection may include confidential and/or non-confidential media content. The service provider storage is configured to store only non-confidential media content while the customer storage is configured to store confidential media content. Any confidential and/or non-confidential media content originating from the mobile device may be transmitted via the cellular connection to the customer computer, wherein the confidential media content is stored on the customer storage while the non-confidential media content is stored on the service provider storage. With the media content which forms the electronic media collection being stored on the service provider storage and customer storage, the mobile device may not need a mobile storage (or a large mobile storage). However, in some embodiments, the mobile device includes a mobile storage for storing confidential media content. The system comprising the mobile storage provides redundancy in terms of transmission of confidential media content to the controller. Specifically, the electronic media collection includes an electronic address for pointing to a location of the confidential media content stored in the customer storage. The electronic media collection may also include a mobile address for point to a location of the confidential media content stored in the mobile storage. Accordingly, upon receiving the electronic media collection, the controller can either retrieve the confidential media content directly from the customer storage via a network connection between the controller and a customer server coupled to the customer storage or from the mobile storage via a cellular connection between the controller and the mobile device. If the network connection coupling the controller with the customer storage fails, the controller is adapted to obtain the confidential media content from the mobile device. Conversely, if the cellular connection coupling the controller with the mobile device fails, the controller is adapted to obtain the confidential media content from the customer computer.

The system further comprises a controller storage for storing the electronic media collection received by the controller. The controller storage also stores any non-confidential media content which forms the electronic media collection. Accordingly, if the network connection between the service provider computer and the controller fails (i.e., the non-confidential media content cannot be retrieved from the service provider storage), the controller can obtain the non-confidential media content from the controller storage and continue to play the electronic media collection.

In another advantageous embodiment, a system for transmitting and displaying electronic media from a service provider to a subscriber is provided comprising a controller for receiving an electronic media collection, a display coupled to the controller for displaying the electronic media collection provided by the controller, a controller storage for storing the electronic media collection, and wherein a mobile device is coupleable to the controller via a cellular connection for generating the electronic media collection. The mobile device is adapted to provide for remote and mobile access to the controller, which enables the subscriber to administer and control what media content is distributed for viewing. The system is further provided such that the electronic media collection includes confidential and/or non-confidential media content. The mobile device, which may have a mobile storage, stores the confidential media content. The non-confidential media content may be transmitted from the mobile device to the controller in order to be stored on the controller storage.

The system may further include a service provider computer that is coupleable to the controller via a network connection, wherein the service provider computer is adapted to receive the electronic media collection transmitted to the controller. A service provider storage is coupled to the service provider computer for storing the electronic media collection. In addition, non-confidential media content may be stored in the service provider storage. For example, non-confidential media content originating from the mobile device may be transmitted through the controller via the cellular connection and to the service provider storage via the network connection. In another example, non-confidential media content produced from the service provider computer may be stored on the service provider storage and transmitted to the controller for inclusion in the electronic media collection.

The system may further comprise a customer computer coupled to the service provider computer via a network connection and a customer storage coupled to said customer computer, wherein the customer computer is also adapted to generate the electronic media collection. With the above configuration of the system, multiple components (e.g., mobile device, customer computer) can be used for generation of electronic media collection. As such, any confidential media content that may be included in the electronic media collection is stored on at least one of the mobile device and the customer storage. The non-confidential media content that may be included in the electronic media collection is stored on at least one of the mobile device and the service provider storage.

Through the cellular connection between the controller and the mobile device, the controller is adapted to transmit status data pertaining to system health to the mobile device and/or the customer computer. In some embodiments, the controller transmits a warning signal to the mobile device if one of the network connections—connection coupling the controller to the service provider computer and connection coupling the service provider computer to the customer computer—is severed and fails. In other embodiments, the controller transmits a warning signal to the customer computer if the cellular connection is severed and fails.

In still another embodiment a method for transmitting and displaying electronic media from a service provider to a subscriber is provided comprising coupling a controller via a network connection to a service provider computer and coupling a display to the controller. The method further comprises the steps of coupling a mobile device to the service provider computer via a cellular connection and generating the electronic media collection to be transmitted to said controller. The electronic media collection is selected from the group consisting of: pre-assembled media content generated and provided by the service provider to the subscriber for selection, modified pre-assembled media content generated by the subscriber; and/or custom generated media content generated for or by the subscriber. The method still further comprises the steps of storing the generated electronic media collection in a service provider storage accessible by the service provider computer and transmitting the electronic media collection from the service provider computer to the controller. Finally, the method comprises the steps of storing the electronic media collection in a controller storage accessible by the controller and displaying the electronic media collection on the display.

In yet another embodiment, a system for transmitting and displaying electronic media from a service provider to a plurality of subscriber locations is provided comprising at least two controllers for receiving first and second electronic media collections respectively and at least two displays coupled to the at least two controllers respectively, the at least two displays displaying the first and second electronic media collections received by the at least two controllers. The system further comprises at least two controller storages coupled to the at least two controllers respectively, for storing the first and second electronic media collections received by the at least two controllers and a service provider computer coupled to the at least two controllers via a network connection, the service provider computer transmitting the first and second electronic media collections to the at least two controllers. The system still further comprises a service provider storage coupled to the service provider computer, for storing the first and second electronic media collections transmitted to the at least two controllers and a customer computer, coupled to the service provider computer via a network connection for creating the first and second electronic media collections transmitted to the at least two controllers. The system is provided such that the at least two controllers are positioned at different physical locations and the subscriber generates the first and second electronic media collections sent to each of the at least two controllers respectively. One or more mobile devices may be coupleable to at least one of the multiple controllers via cellular connections for creating the electronic media collections transmitted to the controllers.

In another embodiment, a system for transmitting and displaying electronic media from a service provider to a subscriber is provided comprising a controller for receiving an electronic media collection, and a display coupled to the controller for displaying the electronic media collection provided by said controller, the display including at least a first and a second frame where the first frame displays media data selected from the group consisting of: audio, video, text, images, animations, web pages, streaming media data and combinations thereof and the subscriber sets a sequential order and time limit for each media data to be displayed on said display. The system further includes a controller storage accessible by the controller, a service provider computer coupled to the said controller via a network connection, the service provider computer transmitting the electronic media collection to the controller, and a service provider storage accessible by the service provider computer. The system is provided such that a mobile device is coupleable to the service provider computer via a cellular connection for generating the electronic media collection to be transmitted to the controller. The electronic media collection is selected from the group consisting of: pre-assembled media content generated and provided by the service provider to the subscriber for selection, modified pre-assembled media content generated by the subscriber, and/or custom generated media content generated by the subscriber. The subscriber selects from among said media content to generate said electronic media collection.

In another embodiment, a system for transmitting and displaying electronic media from a service provider to a subscriber is provided comprising a controller for receiving an electronic media collection, the controller having a controller storage. The system further includes a display coupled to the controller for displaying the electronic media collection provided by the controller, the display including at least a first and a second frame where the first frame displays media data selected from the group consisting of: audio, video, text, images, animations, web pages, streaming media data and combinations thereof and the subscriber sets a sequential order and time limit for each media data to be displayed on said display. The system is provided such that a mobile device is coupleable to the controller via a cellular connection for providing mobile access to the controller, the mobile device being adapted to remotely generate the electronic media collection. The electronic media collection is selected from the group consisting of: pre-assembled media content generated and provided by the service provider to the subscriber for selection, modified pre-assembled media content generated by the subscriber, and/or custom generated media content generated by the subscriber. The subscriber selects from among the media content to generate the electronic media collection.

One objective of the method and system is to provide an apparatus for distribution of electronic media capable of electronically transferring employee communications generated at a provider location to a plurality of remote subscriber locations.

Another objective is to provide an apparatus for distribution of electronic media capable of electronically transferring employee communications generated from a mobile terminal at any geographic location to a plurality of remote subscriber locations.

Another objective is to provide an apparatus for distribution of electronic media that enables both the provider and the subscriber to easily customize the content of employee communications and increases the variety of materials available for inclusion in employee communications.

A further objective is to provide a method for distribution of electronic media in which employee communications are efficiently produced at a provider location, customized by a subscriber and delivered to the subscriber in electronic form for display at remote subscriber locations.

It is still a further objective to provide a system and method in which a subscriber may securely maintain confidential company information on the subscriber's own system to display to employees on a company display, while at the same time variously integrating non-confidential service provider information to the display.

BRIEF DESCRIPTION OF THE DRAWINGS

Other objects and advantages of the present invention will become apparent from the specification and drawings wherein.

DETAILED DESCRIPTION

Figure 1:
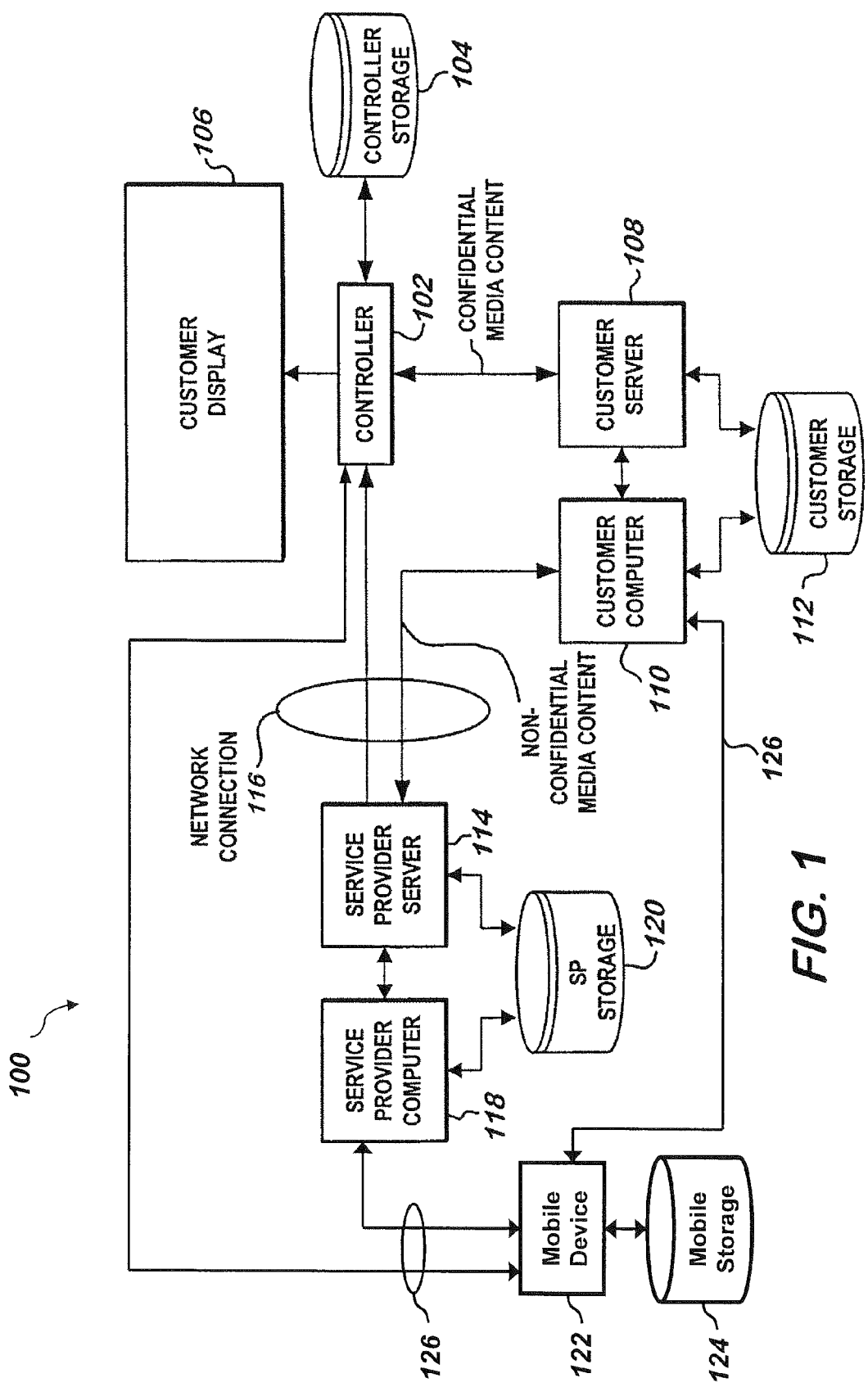
FIG. 1 is a block diagram of one embodiment of the present invention.

As used in this application, the term "deliver" shall be understood to encompass transmitting, downloading and uploading, or any combination thereof.

The term "network" as used herein includes both networks and internetworks of all kinds, including the Internet, and is not limited to any particular network or inter-network.

The term "media data" as used herein means data distributed on storage media, or otherwise, without regard to the form or content thereof, and including but not limited to audio, video, text, images, animations, web pages and streaming media data.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

Referring now to the drawings, wherein like reference numerals designate corresponding structure throughout the views.

FIG. 1 is a block diagram of one advantageous embodiment of electronic media system 100. The electronic media system 100 includes a controller 102 having a controller storage 104, wherein the controller 102 is coupled to a customer display 106. A service provider server 114 is coupled to the controller 102 via a network connection 116, and to a service provider computer 118 and a service provider storage 120. A mobile device 122 is coupleable to the electronic media system 100, and more specifically the service provider computer 118, via a cellular connection 126. In other embodiments, the mobile device 122 may be adapted to couple with the service provider server 114 via a cellular connection. The system 100 may be designed such that a customer computer 110 is coupleable to the service provider server 114 via a network connection 116. A customer server 108 and customer storage 112 may further be included with the customer computer 110 in the electronic media system 100. In some embodiments, the mobile device 122 may also be coupleable to the controller 102 and/or the customer computer 110.

Controller 102 may comprise any type of electronic programmable controller capable of receiving electronic data and transmitting the received data to a video display. In addition, the customer display 104 may comprise virtually any type of video display, however, in a preferred embodiment, customer display 104 comprises 26 inches (66 centimeters) in height and 63 inches (160 centimeters) in width and may comprise a flat panel video display.

The controller 102 is coupled to service provider server 114 via network connection 116. It is contemplated that network connection 114 may be or comprise, for example, any of the following the Internet, an intranet, a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ATM (Asynchronous Transfer Mode) connection, FDDI (Fiber Distributed Data Interface) or CDDI (Copper Distributed Data Interface) connections.

Mobile device 122 may comprise any type of electronic computing or processing device, and more specifically, a handheld device which has the capacity to transmit and receive electronic data. The mobile device 122 includes a display unit with which a system user, e.g., a subscriber, can use to control the functions and capabilities of the electronic media system 100. The display unit may be display integrated with the mobile device 122 in some embodiments and, in other embodiments, it may be an external display which releaseably connects to the mobile device 122. Examples of the mobile device 122 can be a generic cell phone, smartphone, personal digital assistant (PDA), or computer tablet. The size of the mobile device 122 is relatively small compared to conventional desktop computers and laptops, such that the mobile device provides for remote and mobile access to the electronic media system 100 from any geographic location at any time.

The mobile device 122 is coupleable to the service provider computer 118 or service provider server 114 via a cellular connection 126. The cellular connection 126 may comprise any mobile telecommunications technology and standards, including 2G, 3G, and 4G wireless technologies, global system for mobile (GSM) and universal mobile telecommunications system (UMTS) standards, and code division multiple access (COMA), wideband code division multiple access (WCOMA), integrated digital enhanced network (iDEN), time divisional multiple access (TOMA), frequency division multiple access (FOMA), and space division multiple access (SOMA) schemes. The cellular connection 126 can comprise other mobile telecommunications technology and standards known in the art for establishing cellular networks between electronic devices.

A subscriber is able to access a variety of media content provided by the service provider to the subscriber. For example, the subscriber is provided with pre-assembled media content generated and provided by the service provider. This pre-assembled media content comprises media information the service provider has assembled and is believed would be of interest to the subscriber. The service provider may, further suggest certain media content to the subscriber, which the subscriber may or may not select for display to its employees. In addition, the service provider may continually update the pre-assembled media content to provide fresh information to the subscriber so as to keep employees interested in the displayed information.

Figure 8:
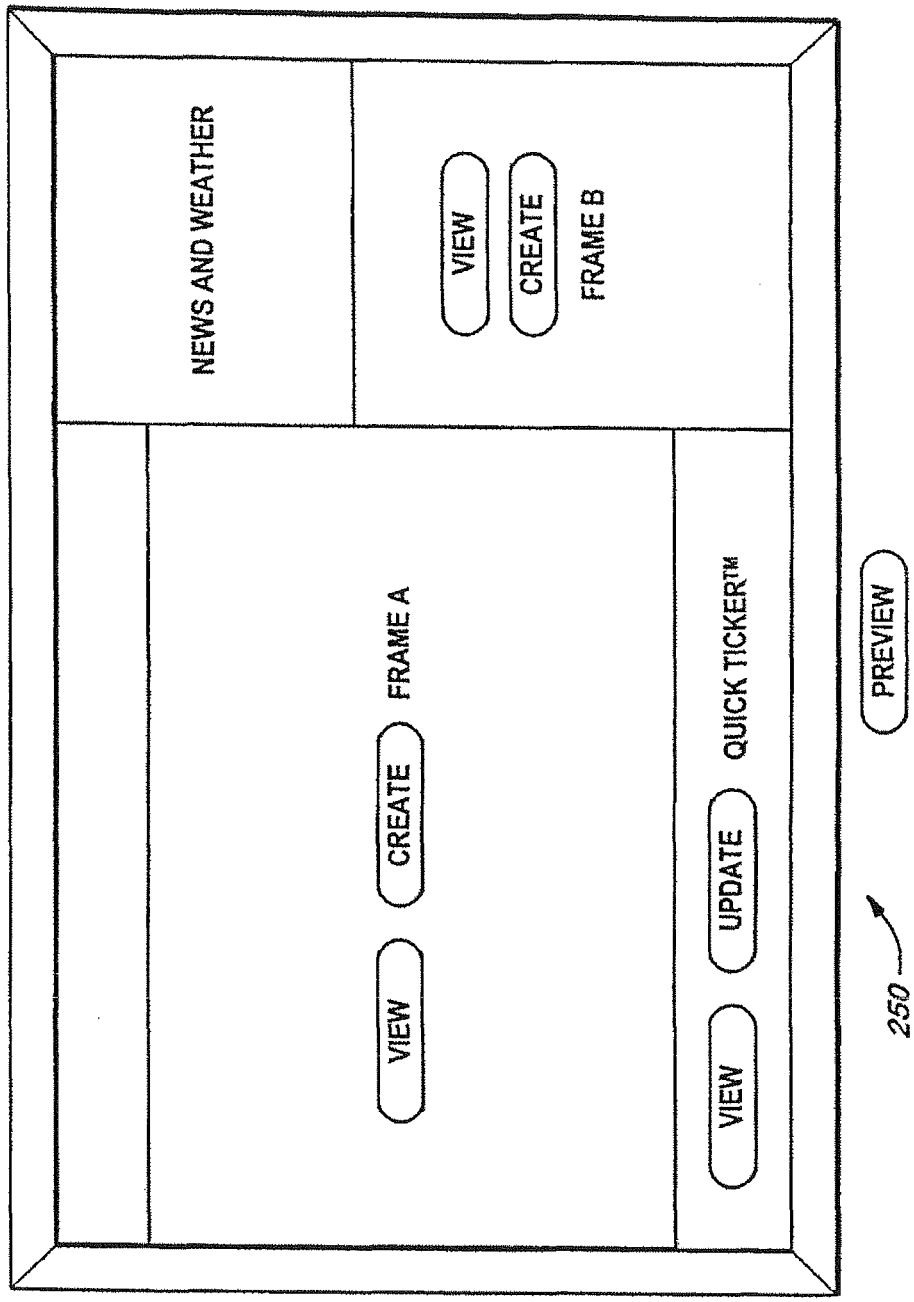

Also provided for the subscriber is the ability to modify the pre-assembled media content. For example, the subscriber may wish to present some of the pre-assembled media content to its employees with some minor changes particular, for instance, to the site location. The subscriber may select the pre-assembled media content and, by means of editing tools in the system software (e.g. FIG. 8), may modify the pre-assembled media content as desired. This may include, adding new content to the pre-assembled media content, deleting certain media content, rearranging the media content including altering the size, look and feel of the media content, altering the play time or play order for certain media content and so forth.

Still further, the subscriber may wish to generate entirely new media content completely unrelated to any of the pre-assembled media content. Again, the subscriber is provided with the tools to be able to compile virtually any information or data desired to be displayed on customer display 106.

Once the subscriber has viewed, modified and/or generated the media content to be displayed, the subscriber may compile an electronic media collection, which comprises all the information that the subscriber desires to be played on the customer display 106. The subscriber may further assemble the media content to play in a desired play order including selecting the length of time each segment of information will be displayed on the customer display 106.

The mobile device 122 serves a remote and mobile terminal for accessing, viewing, and selecting media content, such as the pre-assembled media content generated by the service provider. The mobile device 122 also provides for the subscriber to modify the pre-assembled media content as well as generate entirely new media content. Accordingly, the mobile device provides for on-the-spot administration and control of media content compiled in the electronic media collection and displayed on the customer display 106. The subscriber may use the mobile device, such as a smartphone, to take a photograph and/or draft a short memo and immediately distribute this media data content to his/her employees. As an example, a subscriber may encounter a safety hazard at a manufacturing plant and immediately want to warn all plant workers. To specifically identify the safety hazard, the subscriber can use the mobile device 122 to take a picture of the hazard and/or draft a short message describing the circumstances surrounding the hazard. The mobile device 122 can be used for uploading the picture and short message (i.e., media content) into the electronic media system 100, compiling a new electronic media collection, and distributing the new electronic media collection for display on the customer display 106. As such, the subscriber can perform the above steps quickly while guarding the hazard, thereby reducing the likelihood that a plant worker will be injured by the safety hazard. The mobile device 122, therefore, provides for the subscriber—wherever he/she is located—means to immediately adjust what information and media content is included in the electronic media collection and played on the customer display 106.

The mobile device 122 may have a mobile storage 124 for storing the electronic media collection. More specifically, the mobile device 122 may be used to access and select certain pre-assembled media content and save the electronic media collection in the mobile storage 124. The subscriber may further access and modify pre-assembled media content and save the electronic media collection, including the modified content, in the mobile storage 124. In addition, the mobile device 122 may be used to generate completely new media content and save the electronic media collection as well as the newly generated media content in the mobile storage 124. The system 100 is configured such that the service provider storage 120 also stores the electronic media collection. In this manner, the pre-assembled media content, modified pre-assembled media content, and newly generated media content is saved in the service provider storage 120. The media content stored in the mobile storage 124, therefore, may be saved in the service provider storage 120 as backup. Similarly, the mobile device storage 120 may serve as backup storage for media content saved in the mobile storage 124. By storing the electronic media collection in multiple storage locations, the system 100 provides continuous, uninterrupted playing of electronic media collection on the customer display 106 even if the network connection 116 coupling the controller and the service provider computer 118 or the cellular connection 126 coupling the controller 102 and the mobile device 122 is severed and fails (discussed in detail below).

In some embodiments, it is contemplated that the newly generated media content may comprise sensitive confidential information that the subscriber wants to protect as confidential. In this manner, the subscriber may generate the confidential media content on, for example, mobile device 122 and store the confidential media content on mobile storage 124 on a secure cellular network. When assembling the electronic media collection, rather than transmitting the confidential media content to the service provider server 114 and storing the confidential media content to the service provider storage 120, the subscriber may provide a mobile address pointing to the location of the confidential media content. As examples, the mobile address may comprise one or more of the following: mobile phone number, email address, sms address, and instant messaging address. With the mobile address included, the electronic media collection—generated on mobile device 122 and transmitted to service provider computer 118 via cellular connection 126—is downloaded by the controller 102 from the service provider server 114 and computer 118. The controller 102 also transmits the electronic media collection to the controller storage 104 for storage. When the electronic media collection is run by controller 102, at any point in the program where confidential media content is to be played, the controller is directed to obtain the confidential information at an address on the mobile device 122. More specifically, the controller 102 is coupled to the mobile device 122 via a secure cellular connection 126 to access the confidential media content saved in the mobile device 122. With this configuration, the subscriber may generate confidential media content that will be maintained securely on the subscriber's private mobile network.

It is further contemplated that the subscriber may generate non-confidential information and media content. The non-confidential media content need not be stored strictly in the mobile storage 124 of the mobile device 122. In some embodiments, the non-confidential media content may be uploaded to the service provider computer 118 and saved on the service provider storage 120 as desired. Thus, the mobile storage 124 and the service provider storage 120 both store the non-confidential media content. However, in some cases, the non-confidential media content may be deleted from the mobile storage 124 after being transmitted to the service provider computer 118 and stored in the service provider storage 120. In either scenario, the controller 102 downloads from the service provider server 114 and saves in the controller storage 104 the non-confidential media content that is compiled in the electronic media collection. In yet other embodiments where the mobile storage 124 stores the non-confidential media content, the controller 102 is able to obtain the non-confidential media content from the mobile device 122 in similar fashion as the confidential media content. The mobile address may also point to the location of the non-confidential media content saved in mobile storage 124. The controller 102, therefore, establishes a cellular connection 126 with the mobile device 122 in order to obtain the non-confidential information.

As previously stated, the electronic media system 100 further comprises a customer computer 110, which includes customer storage 112 and is coupled to the service provider server 114 via network connection 116. The customer computer 110 may also be adapted to generate electronic media collection, which is stored on the customer storage 122. A subscriber may generate an electronic media collection involving confidential media content that is stored in the customer storage 112 on a secure network. Accordingly, when assembling the electronic media collection, rather than placing the confidential media content on service provider server 114, the customer may provide an electronic address, such as a URL, pointing to the location of the confidential media content. In this manner, the electronic media collection is downloaded to controller 102 from service provider server 114 and saved on controller storage 104. When the electronic media collection is run by controller 102, any point in the program where confidential media content is to be played, the controller will be directed to obtain that information at an address on the customer system, for example, controller 102 may be coupled to customer server 108 to access the confidential media content saved on customer storage 112. In this way, the subscriber may generate confidential media content that will be maintained securely on the subscriber's private network. With respect to non-confidential media content generated on the customer computer 110, such content is delivered to the service provider server 114 via network connection 116 and stored in service provider storage 120.

The system 100 may also be configured such that a subscriber can generate an electronic media collection via the mobile device 122, wherein the electronic media collection includes confidential information stored in the customer storage 112. More specifically, the mobile device 122 may be coupleable to the customer computer 110 (or the customer server 108) via a cellular connection 126. Using the mobile device 122, the subscriber has the ability to access and view confidential media content stored in the customer storage 112. Upon assembling the electronic media collection, a subscriber simply provides the electronic address pointing to the location of the confidential media content in the customer storage 112. Conversely, the system 100 may also provide for generation of electronic media content on the customer computer 110, wherein the electronic media content includes confidential media content stored on the mobile storage 124. It is further contemplated that the electronic media collection generated may include confidential media content stored on the customer storage 112 as well as confidential media content stored on the mobile storage 124. In such a case, an electronic address and a mobile address is provided in the electronic media collection which point to the location of the confidential media content stored in the customer storage and confidential media content stored in the mobile storage, respectively.

In some embodiments, the mobile device 122 may transmit confidential media content generated thereon to the customer computer 110 for storage in customer storage 112. In other embodiments, the customer computer 110 may be adapted to transmit confidential media content to the mobile device 122 for saving in the mobile storage 124. The electronic media system 100, therefore, provides for all confidential media content to be consolidated in at least one location (i.e., mobile storage 124 or customer storage 112).

With the above configurations, the electronic media system 100 advantageously provides for complete control of the media content to be played on customer display 106. In addition, the system 100 also allows any highly confidential information to be integrated into the electronic media collection while still maintaining the information secure and confidential on the subscriber's own system.

While the subscriber may, at their choice, modify and/or generate their own media content on either the mobile device 122 or the customer computer 110, the subscriber may simply use the pre-assembled media content. The subscriber can set up the system to automatically update the electronic media collection with new pre-assembled media content as such becomes available. Alternatively, the subscriber may set the system up to provide the subscriber with a notification that new pre-assembled media content for the subscriber's review and authorization to play. Still further, the subscriber may set the system up such that the electronic media collection can only be updated manually. As can be seen, a maximum amount of control is provided to the subscriber for generation, modification and display of media content.

In an advantageous embodiment, controller 102 queries service provider server 114 for an electronic media collection to be run on an associated customer display 106. It is contemplated that controller 102 may query service provider server 114 at a period time interval, e.g. every 15 minutes, such that the electronic tool collection is automatically updated. The automatic query function also may provide a diagnostic tool for system 100. For example, if the controller 102 does not query service provider server 114 within a certain time frame, the system 100 may provide an alert to the service provider or the subscriber regarding such. In this manner, the system will not experience significant "down time" as no one is aware the controller 102 is not functioning properly.

Another advantage of the present embodiment is that, since controller 102 downloads the electronic media collection and stores it in controller storage 104, which may or may not be a cache memory location, upon severing of the network connection 116, the controller 102 can continue to play the electronic media collection on customer display 106 until the network connection 116 is re-established.

Another advantage of the present embodiment is the storage of media content in multiple locations, which provide redundancy if any of the network connections 116 and cellular connections 126 is severed or fails. In particular, non-confidential media content generated on the mobile device 122 may be stored in the mobile storage 124 as well as the service provider storage 120. If the network connection 116 between the network service provider server 114 is severed, the controller 102 can obtain the non-confidential media content from the controller storage 104 or from the mobile storage 124 via cellular connection 126. Conversely, confidential media content generated on the mobile device 122 may be stored in the mobile storage 124 and the customer storage 112. If the secure network connection coupling the customer server 108 directly to controller 102 is severed or fails, the controller 102 can obtain the confidential media content from the mobile storage 124. If the cellular connection 126 coupling the mobile device 122 to the controller 102 is severed or fails, the controller 102 may obtain the confidential media content from the customer storage 112 via a secure network connection.

Figure 2:
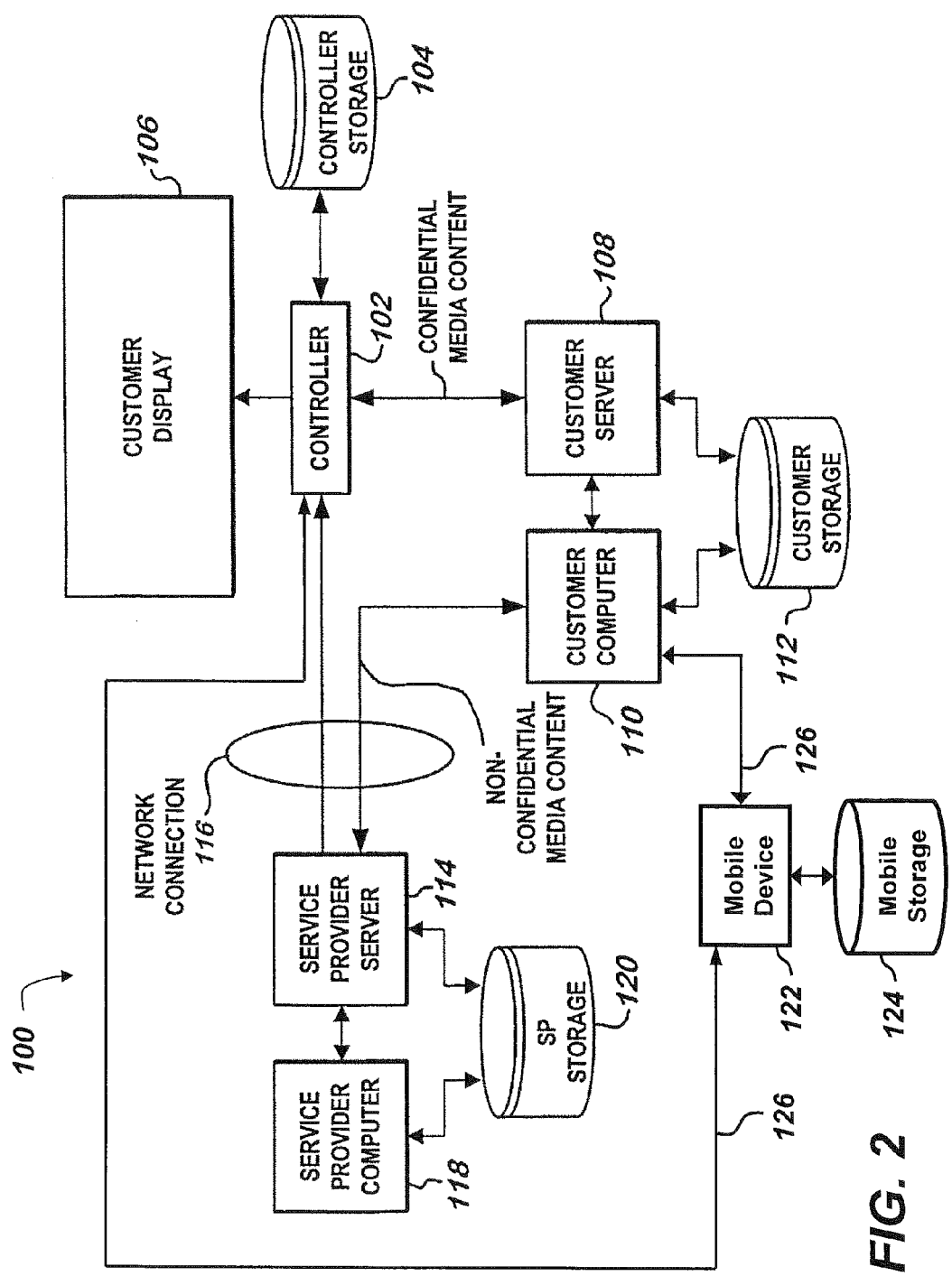
FIG. 2 is a block diagram of another embodiment of the present invention.

FIG. 2 is a block diagram of another advantageous embodiment of electronic media system 100. Here, the system 100 comprises a controller 102 which has a controller storage 104 and is coupled to the customer display 106. A service provider server 114, with a service provider computer 118 and service provider storage 120 connected thereto, is coupled to the controller 102 via a network connection 116. The system also includes a customer computer 110, which may be adapted to generate electronic media collection to be transmitted to the controller 102. The customer computer 110 and customer storage 112 couple to the service provider server 114 and service provider computer 118 via a network connection 116. The electronic media system 100 is further configured such that a mobile device 122 is coupleable to the customer computer, via a cellular connection 126, for generating electronic media collection.

Using the mobile device 122 to generate an electronic media collection, a subscriber can view and access pre-assembled media content and/or modify the pre-assembled media content. The subscriber can also generate completely new media content, which may comprise confidential and/or non-confidential media content. To maintain protection of the confidential information, the mobile device 122 may transmit the confidential media content to the customer computer 110 via a secure cellular connection 126 for saving on customer storage 112. When assembling the electronic media collection, the subscriber merely provides an electronic address, such as a URL, pointing to the location of the confidential media content. Accordingly, once the electronic media collection has been compiled and generated on the mobile device 122, the media collection is delivered to the customer computer 110 and subsequently transmitted to the service provider server 114 for saving on the service provider storage 120. The controller 102 may then download the electronic media collection from the service provider server 114 via the network connection 116 and save the electronic media collection in controller storage 104. Upon running the electronic media collection for display on customer display 106, the controller 102 will be directed to retrieve confidential media content at the electronic address on the customer storage 112. More specifically, a secure network connection is established between the customer server 108 and the controller 102 for communicating the confidential media content.

In some embodiments of the system 100, the mobile device 122 may have a mobile storage 124, which is adapted to store the electronic media collection and any confidential media content that may be generated on the mobile device 122. As such, the subscriber may simply provide a mobile address, such as a mobile phone number, email address, sms address, or instant messaging address, pointing to the location of the confidential media content. The controller 102 recognizes the mobile address and obtains the confidential media content from the mobile storage 124 via a secure cellular connection 126. With copies of the confidential media content being stored on both the mobile storage 124 and the customer storage 112, the system 100 provides for a backup mechanism if either the secure network connection coupling the customer server 108 with the controller 102 or the secure cellular connection coupling the mobile device 122 with the controller 102 is severed or fails. In particular, an electronic media collection may include both an electronic address and a mobile address pointing to locations on the customer storage 112 and the mobile storage 124, respectively, for the same confidential media content. In this manner, if the controller 102 is unable to obtain the confidential media content from the customer server 108 because a secure network connection therebetween cannot be established or such network connection is severed, the controller 102 may automatically search and obtain the media content from the mobile storage 124 via the secure cellular connection. Alternatively, if the controller 102 is unable to obtain the confidential media content from the mobile device 122 because a secure cellular connection therebetween cannot be established or such cellular connection is severed, the controller 102 may automatically search and obtain the media content from the customer server 108 via the secure network connection. It is further noted that the system 100 may be configured such that the controller 102 by default first uses the electronic address to try obtaining the confidential media content from the customer storage. However, the system 100 may be configured such that the controller 102 by default first uses the mobile address to try obtaining the confidential media content from the mobile storage 124.

Figure 3:
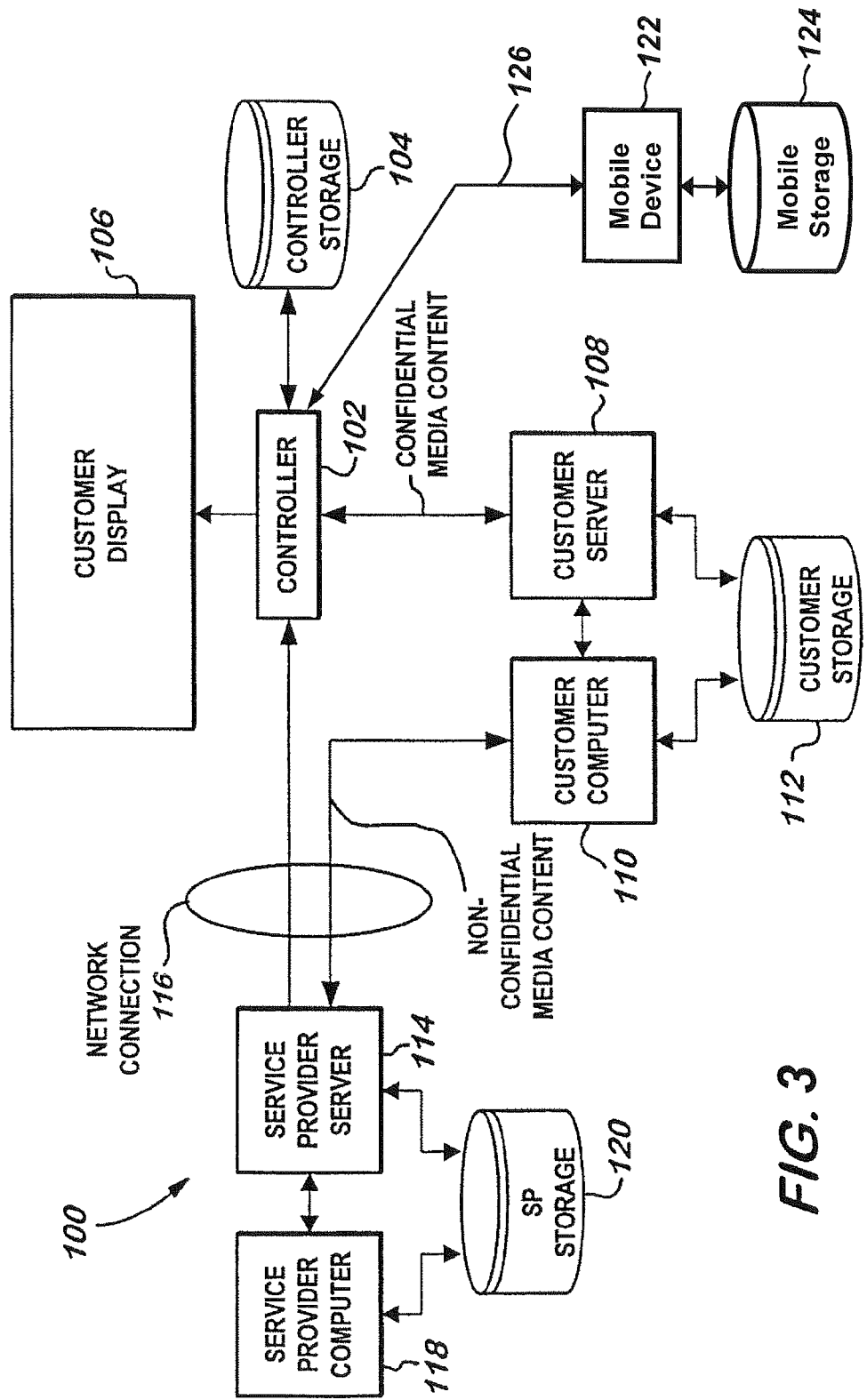
FIG. 3 is a block diagram of another embodiment of the present invention.

With respect to non-confidential media content that may be generated on the mobile device 122, such content is transmitted to the customer computer 110 via cellular connection 126 and subsequently transmitted to the service provider server 114 via network connection 116 for saving on the service provider storage 120. Since a network connection coupling the service provider server 114 with the customer computer 110 exists, the system 100 does not require a cellular connection coupling the mobile device 122 directly to the service provider computer 118 (or service provider server 114) for communicating the non-confidential media content. Referring to FIG. 3, still another advantageous embodiment of electronic media system 100 is shown. At a minimum, the system 100 has a controller 102 for receiving an electronic media collection, a customer display 106 coupled to the controller for displaying the electronic media collection, a controller storage 104 adapted to save the electronic media collection, and wherein a mobile device 122 is coupleable to the controller 102 via a cellular connection 126 for providing remote and mobile access to the controller and generating the electronic media collection. The mobile device 122 may have a mobile storage 124 for storing the electronic media collection generated on the mobile device 122.

By way of the mobile device 122, a subscriber may generate new media content to include in the electronic media collection. The newly generated media content may comprise confidential media content and/or non-confidential media content, wherein both types of media content can be stored on the mobile storage 124. The non-confidential media content does not require any special protection and thus may simply be uploaded to the controller 102 and saved on the controller storage 104. However, this is not the case for the confidential media content. Specifically, when assembling the electronic media collection, rather than placing the confidential media content into controller storage, the subscriber may provide a mobile address pointing to the location of the confidential media content stored in the mobile storage 124. The controller 102 then downloads the electronic media collection compiled from the mobile device 122 and runs the media collection for display on the customer display 106. At any point in the electronic media collection where confidential media content is to be played, the controller 102 is directed to retrieve such information at the mobile address on the mobile storage 124 via the secure cellular connection 126. With this particular configuration, the subscriber may generate confidential media content that will be maintained securely on the subscriber's private network.

The system 100 may further include a service provider server 114 coupled to the controller 102 via a network connection 116 as well as a service provider computer 118 and a service provider storage 120 coupled to the service provider server. The service provider computer 118 is adapted to receive the electronic media collection generated on the mobile device 122 from the controller 102 and save the electronic media collection in the service provider storage 120. A customer server 108 and customer computer 110 coupled to a customer storage 112 may also be included in the system 100. The customer computer 110 is coupled to the service provider server 114 via a network connection 116. Like the mobile device 122, the customer computer 110 is adapted to generate electronic media content, which is saved on the customer storage 112 and transmitted to the controller 102. The customer computer 110, therefore, provides for the subscriber to access and select pre-assembled media content, modify pre-assembled media content, and/or generate completely new media content. It is noted that the service provider computer 118 is adapted to save the electronic media content generated on the customer computer 110. The customer computer 110 functions in the same manner as previously discussed with respect non-confidential media content and confidential media content. Specifically, confidential media content is stored in the customer storage 112 and not in the service provider storage 120. Instead, the electronic media collection includes an electronic address which points to a location of the confidential media content on the customer storage 112.

With both the customer computer 110 and mobile device 124 adapted to generate electronic media collection, there may be instances where generation of electronic media collection occurs simultaneously (or near the same time) at both components. In order to resolve any issue regarding which electronic media collection the controller 102 plays, the controller 102 may be configured to give priority to one component over the other. For example, if the system 100 is configured to give the customer computer priority, the controller 102 will download and play the electronic media collection generated on the customer computer despite there being an electronic media collection generated on the mobile device. Alternatively, the system 100 may be configured to give the mobile device priority. The controller 102 may also provide a warning to both mobile device 124 and customer computer 110, indicating simultaneous generation of electronic media collection has occurred. As such, the subscriber on each component is notified of the situation.

Further, the controller 102 is adapted to provide system health status data to the mobile device 122 via the cellular connection 126 and to the customer computer 110 via the network connections 116 coupling the controller 102 to the service provider server 114 and to the customer computer 110. For example, the subscriber, on either the mobile device or customer computer, can view what media content is currently being displayed on the customer display 106. The subscriber can also monitor how long the controller 102 has been playing a particular electronic media collection. The controller 102 is further adapted to provide an alert indication to one or more of the service provider computer 118, customer computer 110, and mobile device 122 when any of the networks connections and cellular connections is severed or fails. When at least one of the network connections 116— between controller 102 and service provider server 114 and between service provider server 114 and customer computer 110—fails, the controller transmits a warning signal to the mobile device 122. Alternatively, if the cellular connection coupling the controller 102 with the mobile device 122 is severed or fails, the controller transmits a warning signal to customer computer and/or service provider computer. As a result, this configuration of the system 100 helps to reduce any downtime that may occur due to faults in the network or cellular connections.

While FIGS. 1-3 have been discussed in connection with only one customer display 106 location, it is contemplated that the subscriber may have many differing display locations, whether in the same complex or in many differing complexes. The subscriber is given maximum control of the media content provided to the various displays as described above. For example, the subscriber may wish to present certain media content to all maintenance personnel in the various complexes, the subscriber may assemble a media collection and assign the collection to a particular group for display. Alternatively, the subscriber may want to provide different information to a customer display 106 for management personnel. The system 100 allows for the full customization of content, while at the same time, allowing the subscriber to associate collections with particular groups to facilitate ease of directing the media content to the correct customer display 106.

Figure 4:
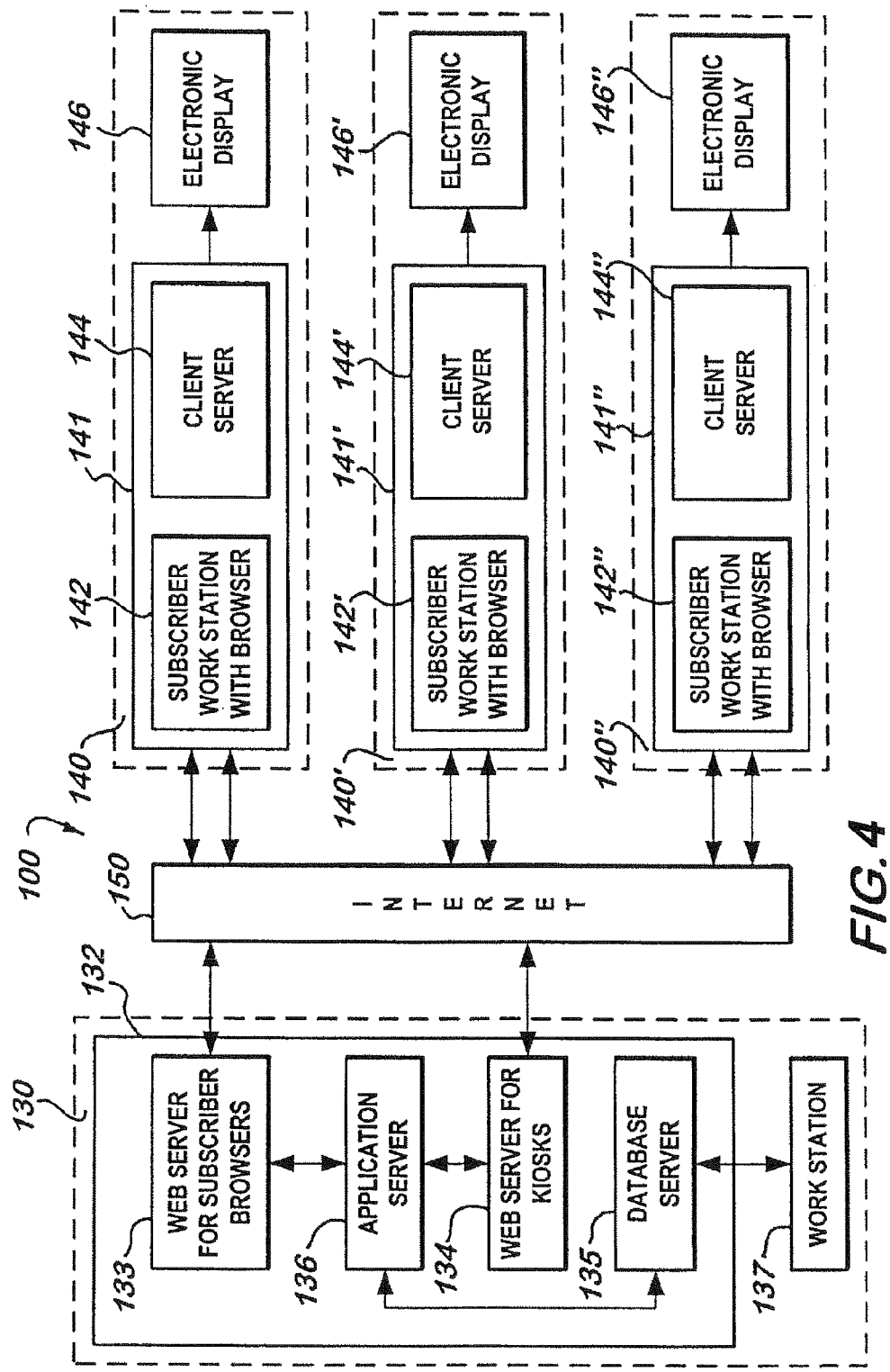
FIG. 4 is a partial flow diagram for a method of distributing electronic media according to the systems of FIG. 1-3.

Another embodiment of an apparatus for distribution of electronic media according to the present invention is schematically illustrated in FIG. 4 and generally designated by the numeral 100. The apparatus for distribution of electronic media 100 facilitates electronic transmission of employee communications from a primary location to one or more remote subscriber locations. The employee communications may take the form of a "poster" as that term is commonly understood, where the poster is created and maintained in electronic form. A typical electronic poster or media collection may include text and graphics arranged to be visually attractive and convey information pertinent to a subscriber's business, workplace or employees. The subject matter of the employee communications may involve safety, quality, teamwork, morale, self motivation, subscriber news releases, employee activities and the like.

The term "employee communication" as used herein is intended to include all forms of visual communication including graphics, written and printed text along with photographs, visual works and artistic material displayed either alone or in any combination. Particular employee communications may take the form of an electronic media collection or poster as described above and further include video and audio presentations.

The apparatus for distribution of electronic media 100 comprises a main server system 130 located at a primary location and a multiplicity of client or subscriber communication and display systems 140, 140', 140" located at each remote subscriber location. The subscriber communication and display systems 140, 140', 140" communicate with the main server system 130 via, for example, an Internet connection 150, or other suitable communications pathway.

The main server system 130 comprises a computer 132 configured to function as a first web server 133, a second web server 134, a data base server 135, and an application server 136. While the main server system 130 is described in terms of several services and server functions, a single computer 132 may be configured to provide all functions and incorporate all described services. The computer 132 may be any commercially available server such as those manufactured and marketed by the Compaq Corporation or may be or include, for instance, any personal computer running the Microsoft Windows® 95, 98, 2000 or later version, Millenium®, NT®, Windows CE®, Palm® OS, Unix®, Linux®, Solaris®, OS/2®, BeOS®, MacOS® or other operating system or platform. Computer 132 may also be or include any microprocessor-based machine such as an Intel® x86-based device or Motorola 68K or PowerPC device, microcontroller or other general or special purpose device operating under programmed control. In addition, computer 132 may be connected to the Internet connection 150 in a well-known manner. The first web server 133 is configured to be accessible by one or more subscriber work stations 142, 142', 142" to allow subscribers to modify the content of the employee communications.

The second web server 134 may be similar to web server 133 although modified to communicate via with one or more client servers 144, 144', 144". It will be understood that while two web servers 133 and 134 are provided, one web server performing both functions may be employed instead. The database server 135 may be used to store subscriber information such as subscriber identification, business type, routing information and media data such as employee communication collections developed at a workstation 137 and as modified by the application server 136 as discussed below. Numerous workstations 137 may be employed. Each workstation 137 is configured so that a graphic designer may develop electronic employee communications (which may take the form of electronic media collections) and collect them together into employee communication collections which may contain, for example, collections of media collections and messages for a particular subscriber. The employee communications are created at the workstation 137, using software such as, for example but not limited to, Adobe Photoshop™ or Adobe Illustrator™. The electronic employee communications are then sent to application server 136 where they are organized by edition and subscriber. The work station 137 communicates with the data base server 135 to transmit various electronic employee communications, etc., which are developed at the work station 137 in a conventional manner. The electronic employee communications are converted into an appropriate format for transmission over the Internet connection 150, such as file transfer protocol (FTP), and then stored before transfer to a client communication and display system 140, 140', 140".

The application server 136 communicates with both the first and second web servers 133, 134 and with the data base server 135. The application server 136 provides coordination between the web servers 133 and 134 and allows access to the electronic media collections contained in data base server 135. The application server 136 includes application software that tracks and distributes content according to subscriber data and as modified by subscribers according to the method of the present invention.

The client communication and display system 140, 140', 140" comprises a computer 141, 141', 141" respectively, that may include a client workstation 142, 142', 142", a client server 144, 144', 144", and an electronic display 146, 146', 146". The client workstation 142, 142', 142" communicates with the web server 133 via the Internet connection 150. The client workstation 142, 142', 142" preferably comprises a web browser sold under the trademark EXPLORER by the Microsoft Corporation of Redman, Wash. Optionally, other web browsers, such as that sold under the trademark NETSCAPE by the Netscape Communications Corporation of Mountain View, Calif., may be employed. The client work station 142, 142', 142" interactively communicates with web server 133 to transmit subscriber input, for example, to modify an employee communication collection and receive an updated version of the employee communication collection.

The electronic display 146, 146', 146" may be any suitably large electronic display but is preferably a large flat panel gas plasma display, such as those manufactured and sold by the Sony corporation of Japan.

The client server 144, 144', 144" receives employee communication collections (alternatively referred to as electronic media collections) in the form of data in a particular format, for display on the electronic display 146, 146', 146". It will be appreciated that the computer 141, 141', 141" may be located on a housing supporting the electronic display 146, 146', 146", but is preferably separated some distance therefrom. In any event, the client server 144, 144', 144" communicates with the web server 133 via the Internet connection 150. The client server 144, 144', 144" preferably comprises a web browser, which may be configured in a display mode whereby the browser receives data from the web server 133 and generates a continuous display. In particular, it will be understood that a number of channels of the web browser may be used to simultaneously display various elements of the employee communications collection for varying amounts of time.

Figure 7:
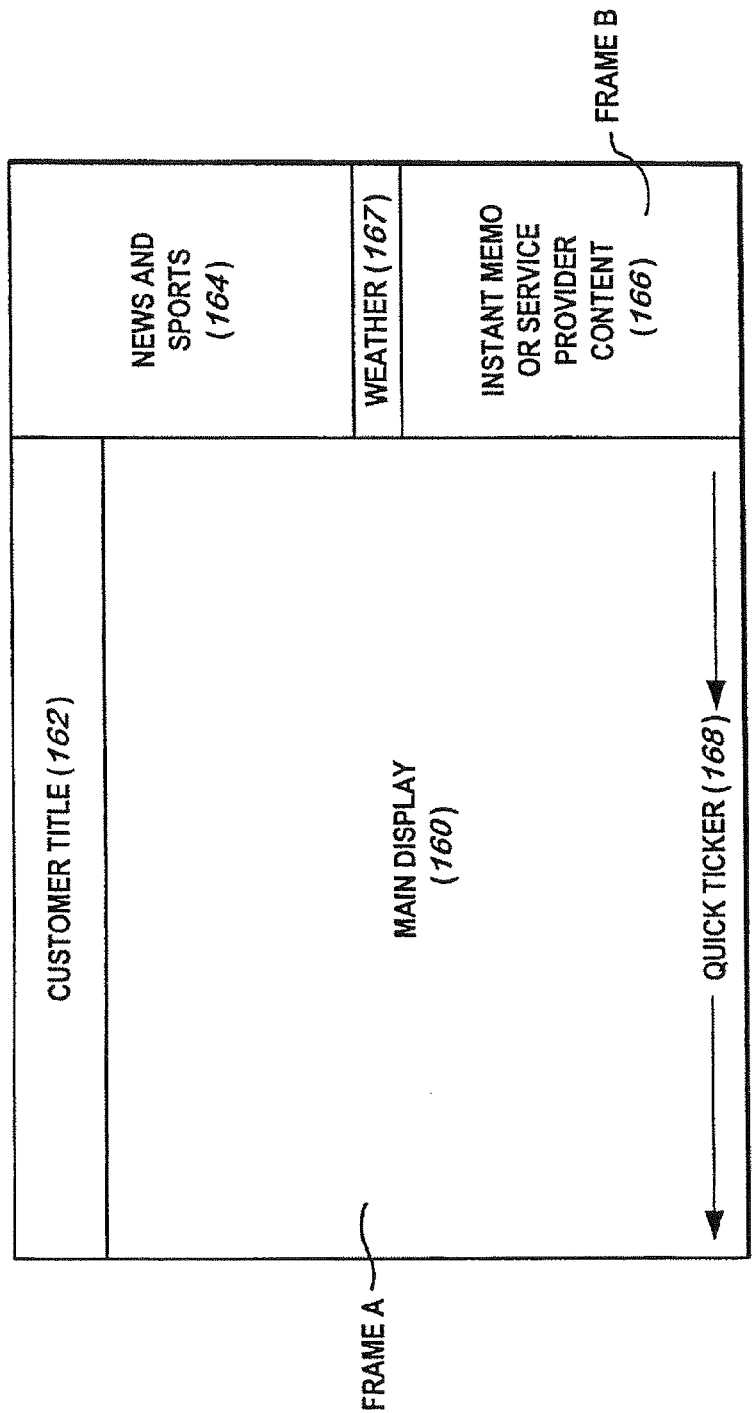
FIGS. 7-8 are representative screens generated by application software, which a subscriber may use in connection with the apparatus and method of FIGS. 1-4.

The client server 144, 144', 144" communicates employee communication collections (electronic media collections) to the electronic display 146, 146', 146" for display. Preferably, the electronic display 146, 146', 146" may comprise a plurality of sections for displaying different materials (FIG. 7). For example, as seen in FIG. 7, four separate sections 160, 162, 164 and 168 may be provided—each of which may be functioning simultaneously and at different update times and periods. Each section may sequentially display varying messages and/or visual media content, slogans, etc. For example, in section 160 (Frame A) audio/visual electronic media content may be played or shown for a specified time period, e.g. fifteen (15) minutes, and then switch to custom executive media content. Section 166 (Frame B) may display, concurrently with the employee communications displayed on section 160, an employee communication, then switch to Good Will Motivator™ media content and thereafter switch, for example, to a management suggested letter. The relative timing may also be selected. For example, the messages may alternate every fifteen (15) minutes and may start seven and one half (7.5) minutes after the electronic media content is initially displayed in section 160. Section 164 may display news or announcements such as news headlines, sports scores and may be additionally split into a subsection 167 for display of local current and/or 3 or 5-day weather forecasts. The electronic display 146, 146', 146" may include media such as a client's name or trademark, etc. as rated at 162, which may be permanently affixed thereto.

Operation.

Figure 5:
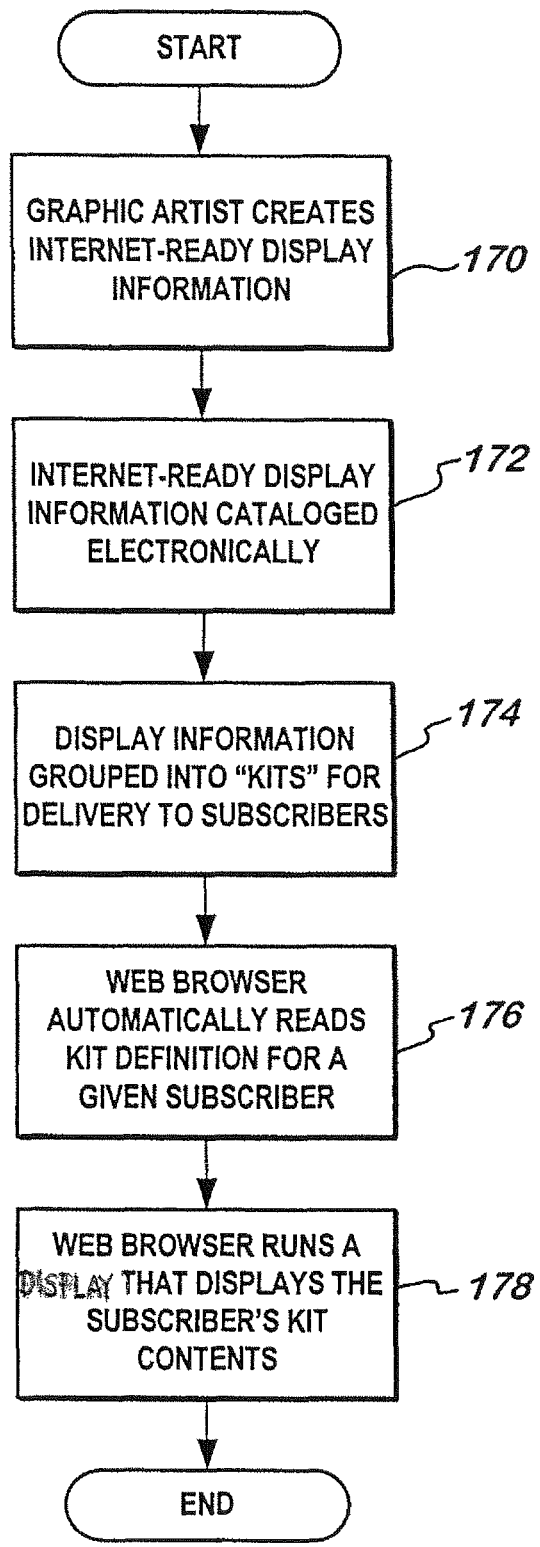
FIG. 5 is a partial flow diagram for a method of distributing electronic media according to the systems of FIGS. 1-4.
Figure 6:
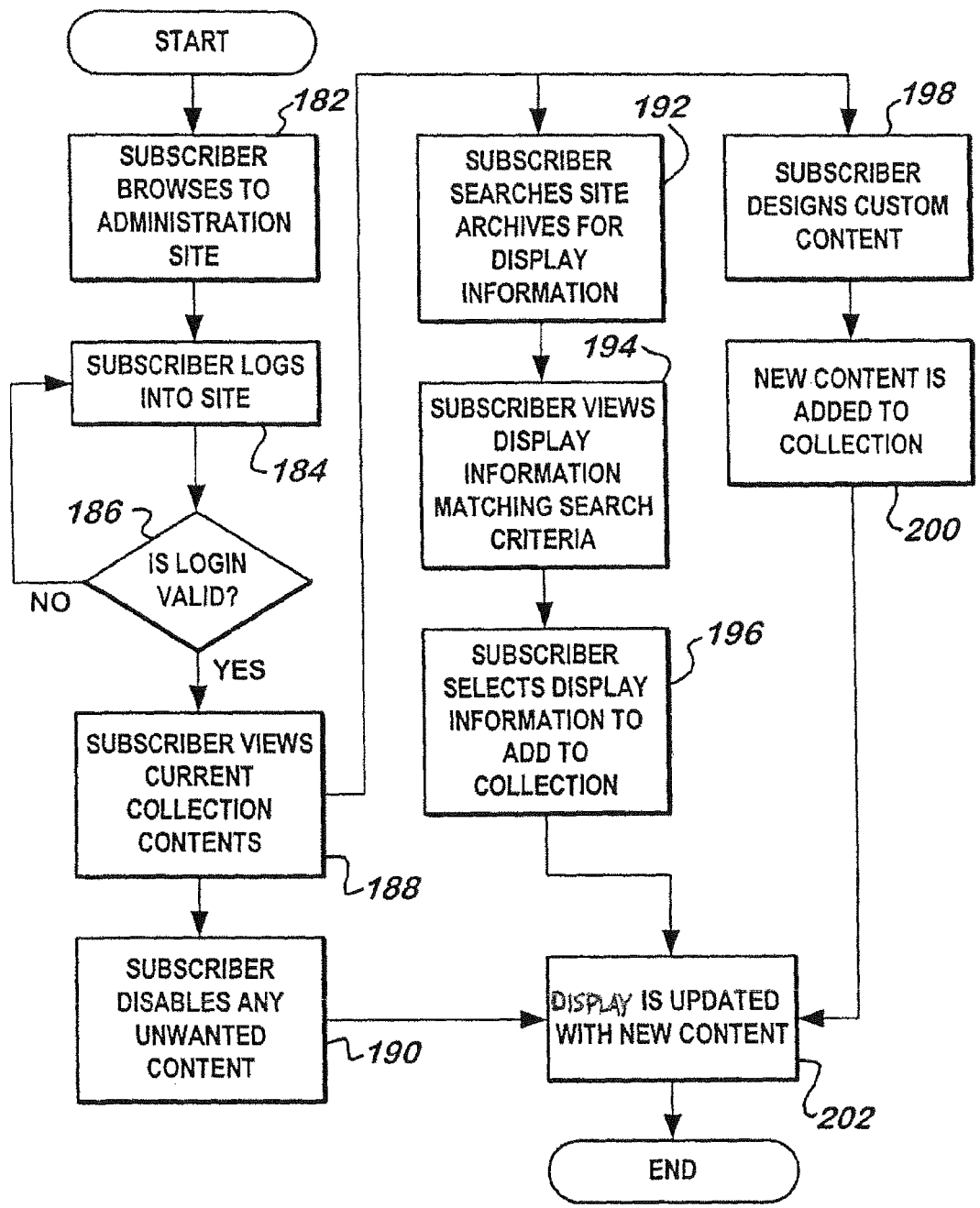
FIG. 6 is an annotated diagram of a representative electronic display according to FIGS. 1-4.

With reference to FIGS. 4, 5 and 6, a graphic artist using work station 137 creates an employee communication in electronic form that is compiled into an employee communications collection in a data format, as discussed above, that is suitable for transmission over the Internet as shown at 170 (FIG. 5). The electronic employee communications are cataloged and stored in the data base server 135 at 172 (FIG. 5).

The application server 136 and workstation 137 function to group electronic employee communications by topic and edition. The electronic employee communications may also be compiled into employee communications collections arranged by, for example, a particular subscriber or subscriber type such as retail or manufacturing subscribers at 174 (FIG. 5.) For example, the subscribers of systems 140 and 140' may have access only to one set of electronic media collections while the subscriber of system 140" has access only to a different set of electronic media collections. The application server 136 is also configured to indicate the last time and date that revisions or updates have been made to the employee communication collections.

Each subscriber may modify these collections using a subscriber workstation 142, 142', 142". The subscriber may select specific electronic employee communications (electronic media content) for display on the electronic display 146, 146', 146". Thereafter, the client server 144, 144', 144" communicates the electronic employee communications to the electronic display 146, 146', 146" at 176 (FIG. 5), as described above, for display at 178 (FIG. 5). The subscriber can query through the web browser to determine the latest times and dates of electronic media collection changes.

The subscriber may also modify the contents of an employee communication collection as follows. Using a subscriber workstation 142, 142', 142", the subscriber contacts the web server 133 (see, 182 and 184 of FIG. 6) and logs onto the web server 133. After checking for proper password and client 10 at 186, the subscriber is allowed to view the current employee communication collection contents at 188. The subscriber may then choose between different options. The subscriber may search for electronic employee communications by topic, for example, electronic media content with themes such as safety, attitude, cooperation, etc. The subscriber may further remove any unwanted visual electronic media content or other content at 190. The subscriber may also search, using the application server 136, to select particular electronic media content or display information and add the selected media content to the employee communications collection at 192, 194 and 196. The subscriber may have access to various screens such as screen 250 (FIG. 8) to facilitate the search and selection. Optionally, the subscriber may design its own electronic media content within the application or simply provide electronic material for display, all of which may be added to the employee communications collection at 198 and 200. Once a subscriber has completed the modification, the application server 136 makes the updated employee communications collection available. Accordingly, when the client server 144, 144', 144" polls the web server 133, new media data is downloaded for display on the electronic display 146, 146', 146" as shown at 202 (FIG. 6.)

While the present invention has been described in connection with what are presently considered to be the most practical and preferred embodiments, it is to be understood that the present invention is not limited to the disclosed embodiments. Rather it is intended to cover all of the various modifications and equivalent arrangements including within the spirit and scope of the appended claims.

What is claimed is:

1. A system for transmitting and displaying electronic media from a
    service provider to a subscriber comprising:
    a controller for receiving an electronic media collection;
    a display coupled to said controller for displaying the electronic media collection provided by said controller, said display including at least a first and a second frame where the first frame displays media data selected from the group consisting of: audio, video, text, images, animations, web pages, streaming media data and combinations thereof and the subscriber sets a sequential order and time limit for each media data to be displayed on said display;
    a controller storage accessible by said controller;
    a service provider computer coupled to said controller via a network connection, said service provider computer transmitting the electronic media collection to said controller;
    a service provider storage accessible by said service provider computer; and
    wherein a mobile device is coupleable to said service provider computer via a cellular connection for generating the electronic media collection to be transmitted to said controller;
    said electronic media collection selected from the group consisting of: pre-assembled media content generated and provided by the service provider to the subscriber for selection;
    modified pre-assembled media content generated by the subscriber; and/or custom generated media content generated by the subscriber;
    said subscriber selecting from among said media content to generate said electronic media collection.

2. The system according to claim 1, wherein said mobile device provides for selecting from among said pre-assembled media content, said modified pre-assembled media content, and/or said custom generated media content.

3. The system according to claim 1, wherein said mobile device has a mobile storage for storing said electronic media collection.

4. The system according to claim 3, wherein said electronic media collection comprises confidential media content and/or non-confidential media content, said service provider storage is adapted to store said non-confidential media content and said mobile storage is adapted to store said confidential media content.

5. The system according to claim 4, wherein said electronic media collection includes a mobile address for establishing a cellular connection between said controller and said mobile device and pointing to a location of the confidential media content stored on said mobile storage.

6. The system according to claim 5, where said mobile address comprises at least one of a mobile phone number, email address, sms address, and instant messaging address.

7. The system according to claim 1, wherein:
   a customer computer is coupled to said service provider computer via a network connection, said customer computer being adapted to generate the electronic media collection to be transmitted to said controller;
   said customer computer having a customer storage for storing the electronic media collection.

8. The system according to claim 1, wherein said controller is adapted to transmit to said customer display said electronic media collection stored in said controller storage when the network connection coupling said service provide computer and said controller fails.

* * * * *